(12) United States Patent
Chenevert

(10) Patent No.: US 7,204,073 B1
(45) Date of Patent: Apr. 17, 2007

(54) CONVERTIBLE MOWER DECK WITH INTERLOCKING BAFFLES

(75) Inventor: Jeffrey Paul Chenevert, Apex, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 11/233,635

(22) Filed: Sep. 23, 2005

(51) Int. Cl.
*A01D 67/00* (2006.01)

(52) U.S. Cl. .................................. 56/320.2

(58) Field of Classification Search ............ 56/2, 56/6, 7, 320.1, 320.2, 16.7, 16.9, 13.5, 13.6, 56/17.4, 17.5, 255, 295, DIG. 9
See application file for complete search history.

(56) References Cited

U.S. PATENT DOCUMENTS

| | | | | |
|---|---|---|---|---|
| 3,234,719 A | * | 2/1966 | Rank ......................... | 56/13.6 |
| 4,226,074 A | * | 10/1980 | Mullet et al. .............. | 56/320.2 |
| 5,465,564 A | * | 11/1995 | Koehn et al. .............. | 56/320.2 |
| 5,628,171 A | * | 5/1997 | Stewart et al. ............. | 56/320.2 |
| 5,845,475 A | * | 12/1998 | Busboom et al. .......... | 56/320.1 |
| 6,609,358 B1 | | 8/2003 | Schmidt et al. ............ | 56/320.2 |
| 6,735,932 B2 | | 5/2004 | Osborne ..................... | 56/320.1 |
| 6,751,937 B2 | | 6/2004 | Kobayashi et al. .......... | 56/202 |
| 6,910,324 B2 | | 6/2005 | Kakuk ........................ | 56/255 |

\* cited by examiner

*Primary Examiner*—Arpád Fábián Kovács

(57) ABSTRACT

A convertible mower deck has a plurality of adjoining cutting chambers under a mower deck, each cutting chamber having a cutting blade mounted to the lower end of a vertical spindle. The deck includes openings between adjoining cutting chambers, and gates or baffles under the deck in the openings between adjoining cutting chambers. The gates or baffles include pairs of plates that pivot on vertical axes, and interlock together when moved in the mulching position.

14 Claims, 4 Drawing Sheets

CONVERTIBLE MOWER DECK WITH INTERLOCKING BAFFLES

FIELD OF THE INVENTION

This invention relates to mower decks and, more specifically, to mower decks that are convertible between a discharge or collection position and a mulching position.

BACKGROUND OF THE INVENTION

Mower decks have been designed that are convertible between a discharge or collection position and a mulching position. For example, U.S. Pat. No. 6,609,358 entitled "Mower Having a Mower Deck Adapted for Selective Mulching or Non-Mulching Modes" relates to a mower deck that can be converted between a discharge or collection position and a mulching position. The conversion may be done without using tools, and without separately attaching or detaching components on the deck. The convertible mower deck enables an operator to avoid the inconvenience of having to stop mowing to either remove or install a mulch kit. The convertible mower deck has adjustable baffles between adjacent cutting chambers that can be moved to an open position in which grass clippings move between the cutting chambers and out through a discharge opening, or to a closed position in which grass clippings are mulched by restricting their movement between cutting chambers and blocking the discharge opening. The baffles may be moved to either the open position or the closed position with a handle attached to the top surface of the deck.

When in use, material including debris and grass clippings may build up on the underside of a mower deck. Material build-up may cause partial or complete loss of mulch-on-demand functionality. For example, build up that collects on baffles under the deck may prevent one or more of the baffles from moving completely between a discharge/collection position and a mulching position. As a result, some of the grass clippings may become lodged in or expelled from a gap between the baffles instead of recirculating in the cutting chamber until they are converted to mulch.

When the mower deck shown in U.S. Pat. No. 6,609,358 is operated in the mulch position, each lead or pivoting baffle under the deck should abut against a fixed baffle that is welded to the deck shell. The purpose of the fixed baffle structure is to provide support to the pivoting baffles, and to prevent damage to the pivoting baffles from impacts, while the mower travels forward. However, build up of material on the backside of each pivoting baffle (and/or the fixed baffle it opens against) may block and prevent the pivoting baffle from swinging completely into the full mulch position, and also may stop other baffles from moving completely into the mulch position. If the mower continues to operate, additional clippings may clog the gaps between the baffles, and may lead to a partial to full loss of the ability to move the baffles between the discharge or collection position and the mulching position. To restore full function, the operator may need to stop the mower and clean material such as debris and grass clippings from the underside of the deck. This has an adverse effect on the operator's productivity.

There is a need for a convertible mower deck that can move between a discharge or collection position and a mulching position even if there is a build-up of material on the baffles under the mower deck. There is a need for a convertible mower deck that may continue to operate at a high level of productivity without the need for the operator to stop and clean material from the underside of the deck. There is a need for a convertible mower deck that will not allow grass clippings to clog the gaps between the baffles.

SUMMARY OF THE INVENTION

A convertible mower deck has pivoting baffles that interlock when the deck is in the mulching position. Each baffle pivots between and open position allowing flow of grass clippings between the cutting chambers and a closed position blocking flow of grass clippings between the cutting chambers. Each baffle has a first plate and a second plate, the first plate interlocking with the second plate when the gate is in the closed position.

The interlocking baffle structure helps reduce the build-up of material under the mower deck that otherwise may block the deck from moving to the full mulching position. The interlocking baffles help prevent grass clippings from clogging the gaps between the baffles. The convertible mower deck may continue to operate at a high level of productivity without the need for an operator to stop and clean material from the underside of the deck.

DESCRIPTION OF THE PREFERRED EMBODIMENT

Figure 1:
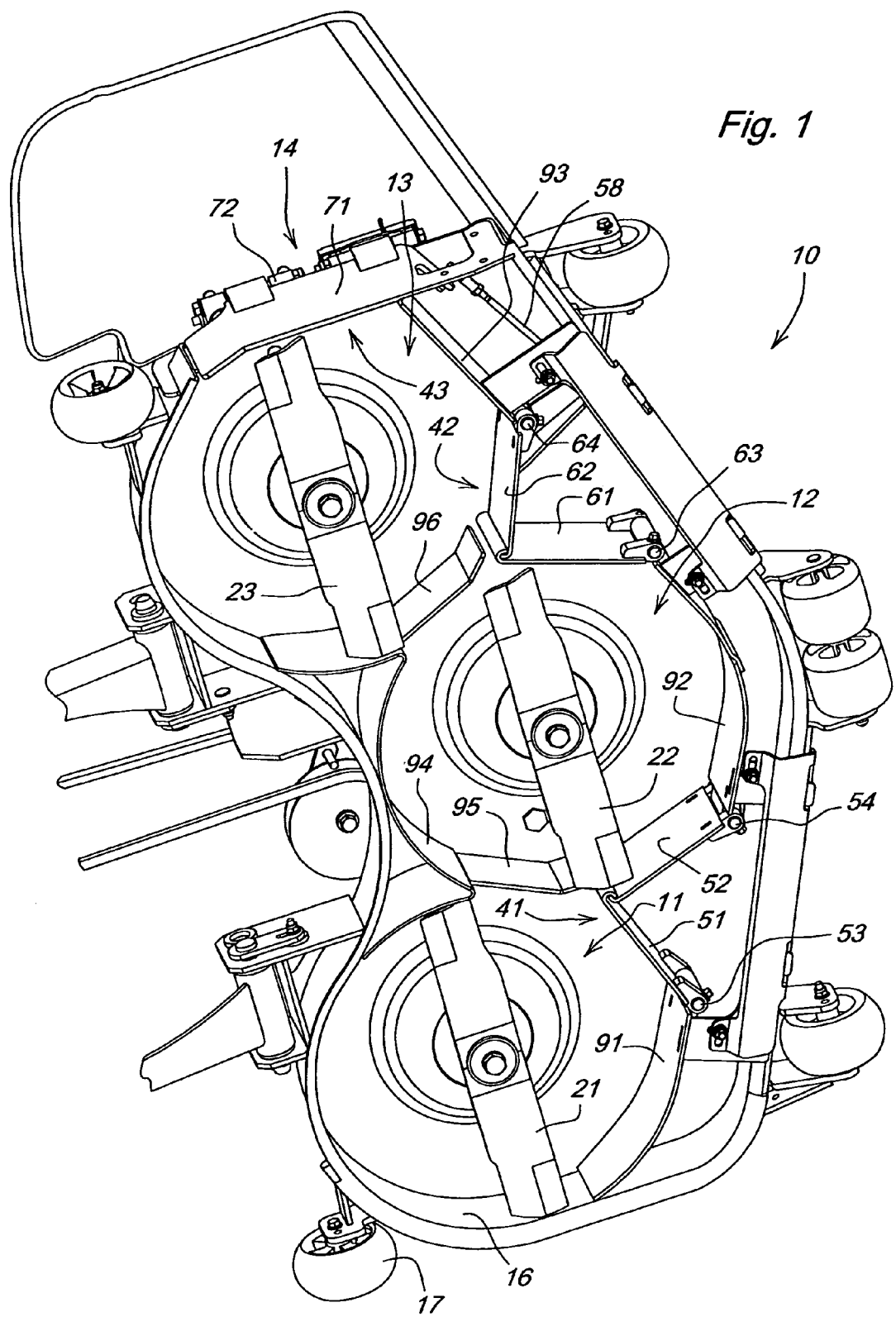
FIG. 1 is a bottom view of a convertible mower deck according to one embodiment of the invention in a mulching position.
Figure 2:
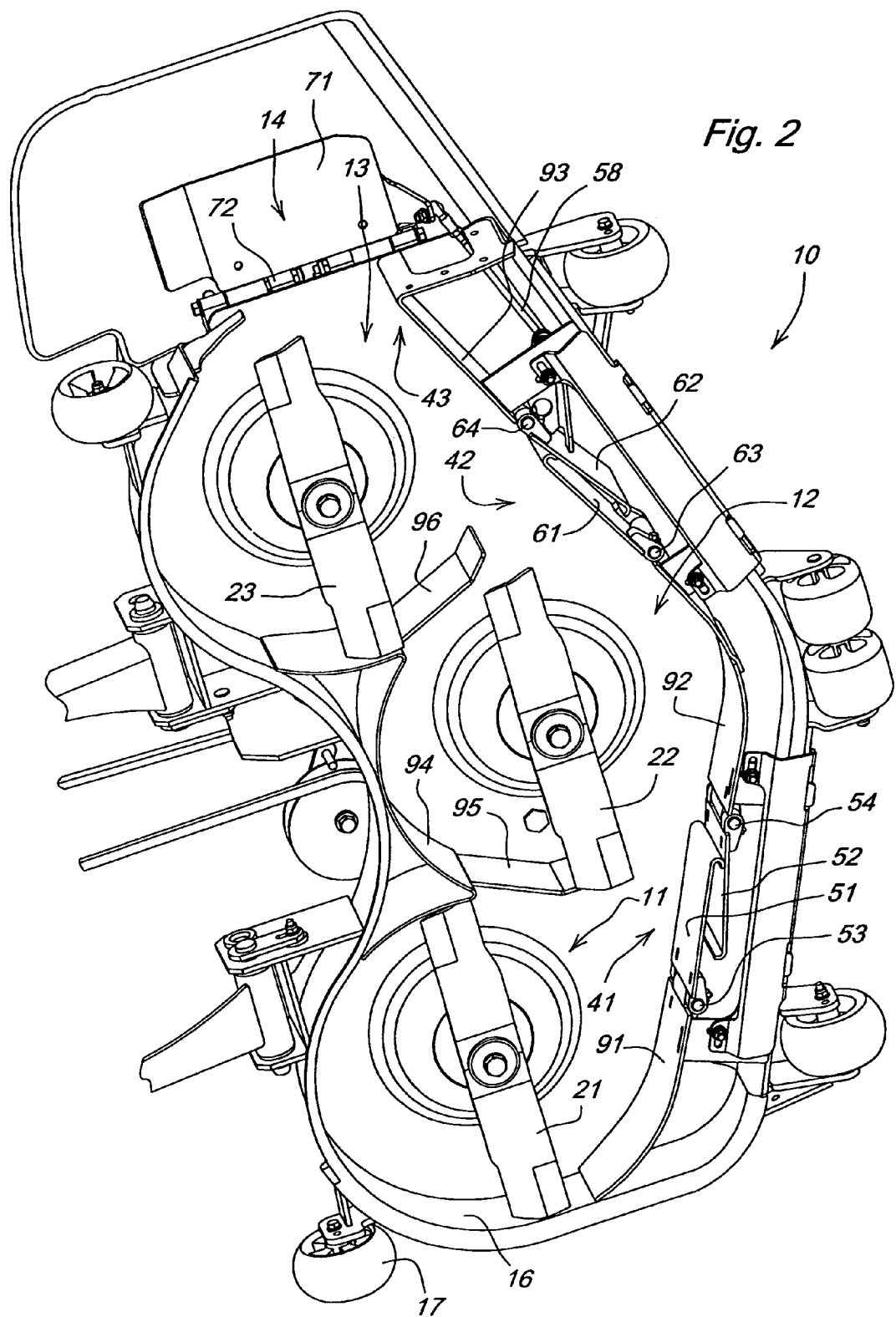
FIG. 2 is a bottom view of a convertible mower deck according to one embodiment of the invention in a discharge or collection position.

In one embodiment of the invention, shown in FIGS. 1–2, convertible mower deck 10 may include three adjacent cutting chambers 11, 12, 13, with each cutting chamber covering or housing a rotary cutting blade 21, 22, 23. The cutting blades may be mounted and secured to the lower ends of generally vertically oriented spindles for rotation on vertical axes. The spindles may be turned by one or more belts wound around pulleys attached to the upper ends of the spindles.

In one embodiment, mower deck 10 may have a skirt 16 extending downwardly around at least a portion of the outer periphery from the top surface of the mower deck. Wheels 17 may be attached to the skirt and/or periphery of the mower deck to help prevent or minimize damage or scalping of the ground surface or turf when mowing.

In one embodiment, pivoting baffles 41, 42, 43 may be positioned under the mower deck. Baffles 41, 42 may be moved to open, close, and control the size of the passage or opening between adjacent cutting chambers, and baffle 43 may control the area between a cutting chamber and a discharge opening. For example, as shown in FIG. 1, the baffles are in a fully closed position for mulching. In FIG. 2, the baffles are in a position for discharge or collection of clippings. Additionally, the baffles may be placed in one or more intermediate positions in which some of the grass clippings may be discharged or collected, and the remainder may be mulched. Baffle 41 is between adjacent cutting chambers 11 and 12, baffle 42 is between adjacent cutting chambers 12 and 13, and baffle 43 is between cutting chamber 13 and discharge opening 14.

In one embodiment, if the baffles are placed in a fully open position, grass may be cut and swept along a flow pathway that extends and interconnects the three cutting chambers, and which continues through discharge opening 14. If the baffles are placed in a fully closed position, grass clippings may be recirculated and recut within each cutting chamber. If the baffles are placed in an intermediate position, a portion of the grass clippings may be swept along the flow pathway between the cutting chambers and out the discharge opening or collected, and the rest of the clippings may be recirculated and recut within each cutting chamber.

In one embodiment, baffle 41 may include a pair of plates 51, 52 mounted on generally vertically aligned hinges or pivot shafts 53, 54 near the front end of the mower deck. Baffle 42 may include a pair of plates 61, 62 mounted on generally vertically aligned hinges or pivot shafts 63, 64 near the front end of the mower deck. Baffle 43 may include plate 71 mounted on generally horizontally aligned hinge or pivot shaft 72. Rod 58 may connect pivot shaft 64 to plate 71.

Figure 3:
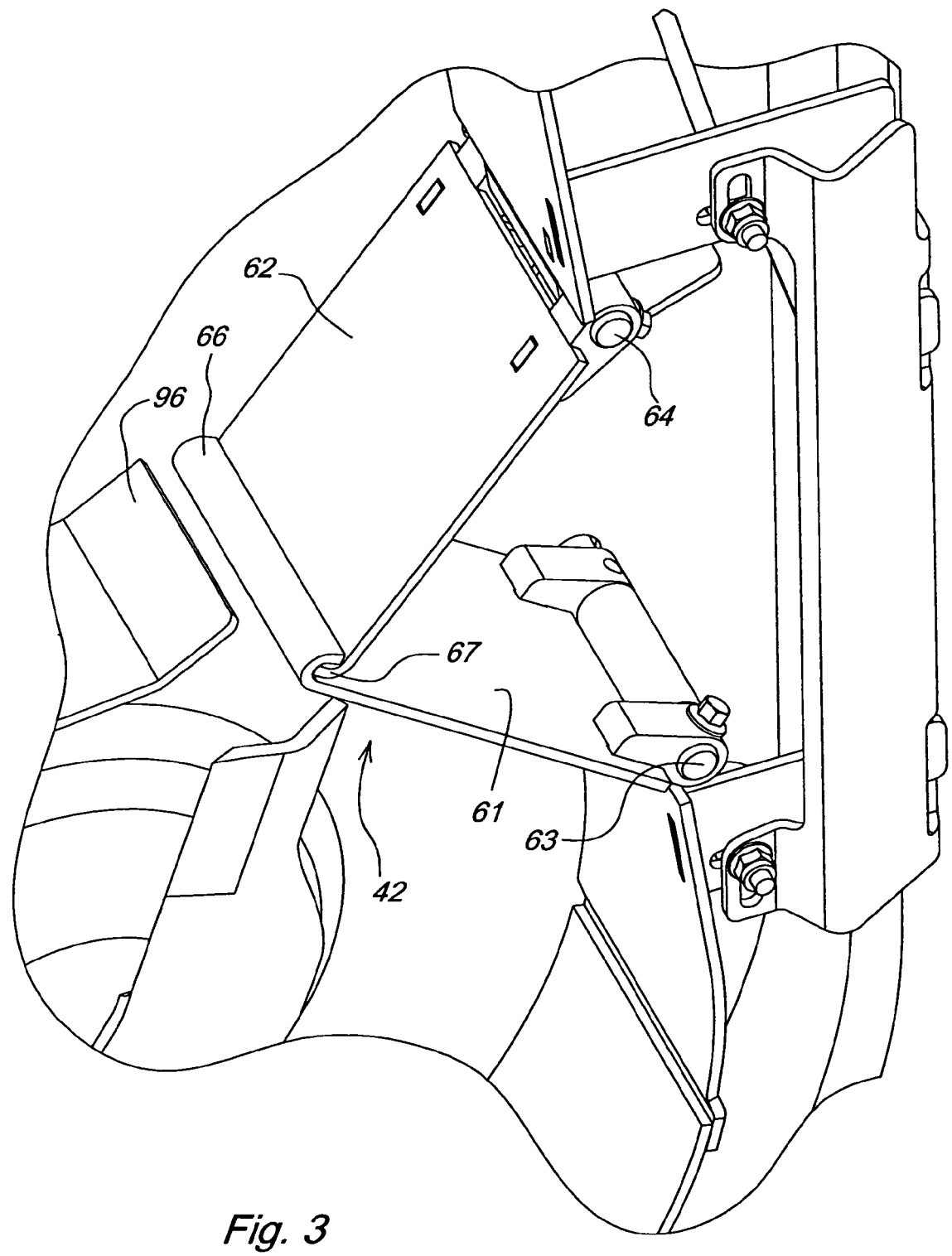
FIG. 3 is a bottom view of an interlocking baffle of the convertible mower deck according to one embodiment of the invention.

In one embodiment, as shown in FIG. 3, the lead plate 61 of baffle 42 may have a "J"-shaped bend 66 on its end opposite its pivot axis, and the secondary plate 62 may have an "L"-shaped bend 67 on its end opposite its pivot axis. Similarly, baffle 41 may have a lead plate 51 a "J"-shaped bend at the end, and a secondary plate 52 with an "L"-shaped bend. When the deck is in the full mulch position with the gates or baffles closed, the lead plate with the "J" shaped bend at the end may engage the secondary plate with the "L"-shaped bend at its end. The engagement allows the pair of plates to interlock, so that the plates provide mutual support. As a result, the interlocking plates provide a more rigid structure, thus preventing damage to the pivoting baffles and other movable components of the convertible mulch-on-demand mower deck.

In one embodiment, the lead plate of each pair covers the end of the secondary plate when the baffles are in the discharge or collection position, as well as the mulch position. Because the lead plate covers the secondary plate, this helps prevent or reduce material build-up on the interlocking surfaces. Additionally, the open side of the "J" bend faces outwardly, away from the main flow of grass clippings and other debris under the mower deck, to further reduce or prevent build-up of material on the interlocking surfaces of each pair of plates.

In one embodiment, the underside of the mower deck includes stationary or fixed baffles that may be configured and positioned such that one of the pivoting plates of each pair may wipe off at least some of the material that may build up on the stationary baffle. For example, plate 61, which is the lead plate of baffle 42, may swing near enough to stationary baffle 96 between cutting chambers 12 and 13 to remove some build-up on the stationary baffle. Similarly, plate 51, which is the lead plate of baffle 41, may swing near the stationary baffle 95 between cutting chambers 12 and 13 to remove build-up of clippings and debris on the stationary baffle.

In one embodiment, a gap may be provided between each pair of interlocked plates and a stationary baffle to allow some build up of material while in the mulching position. In addition, the interlocking surfaces on the active baffles may be located such that they are shielded from grass and debris being processed by the mower blades, preventing material accumulation on the interlocking surfaces.

In one embodiment, the interlocking baffles of the present invention eliminates the need to support the active baffles against a stationary wall.

In one embodiment, stationary or fixed baffles 91–96 may be located under the mower deck to define and separate each of cutting chambers 11–13. For example, stationary front baffles 91–93 may be attached to and/or extend from skirt 16 near the front rim of the deck, and together with the skirt may form a substantially continuous wall or wall member to define the three adjacent cutting chambers. In one embodiment, stationary rear baffles 94–96 may be located under the mower deck adjacent the rear of the deck to further define the cutting chambers.

In one embodiment, if the mower deck is in the mulching position and the baffles are interlocked, they define the perimeters of a plurality of generally cylindrical cutting chambers. There may be a small gap between the adjacent cutting chambers because the closed, interlocked baffles may be spaced from the stationary rear baffles.

In one embodiment, the baffles, in their closed positions, provide a circumferential lower periphery which falls below the cutting plane of each blade. The baffles substantially enclose each cutting blade within its cutting chamber and provide the necessary recirculation for mulching.

Figure 4:
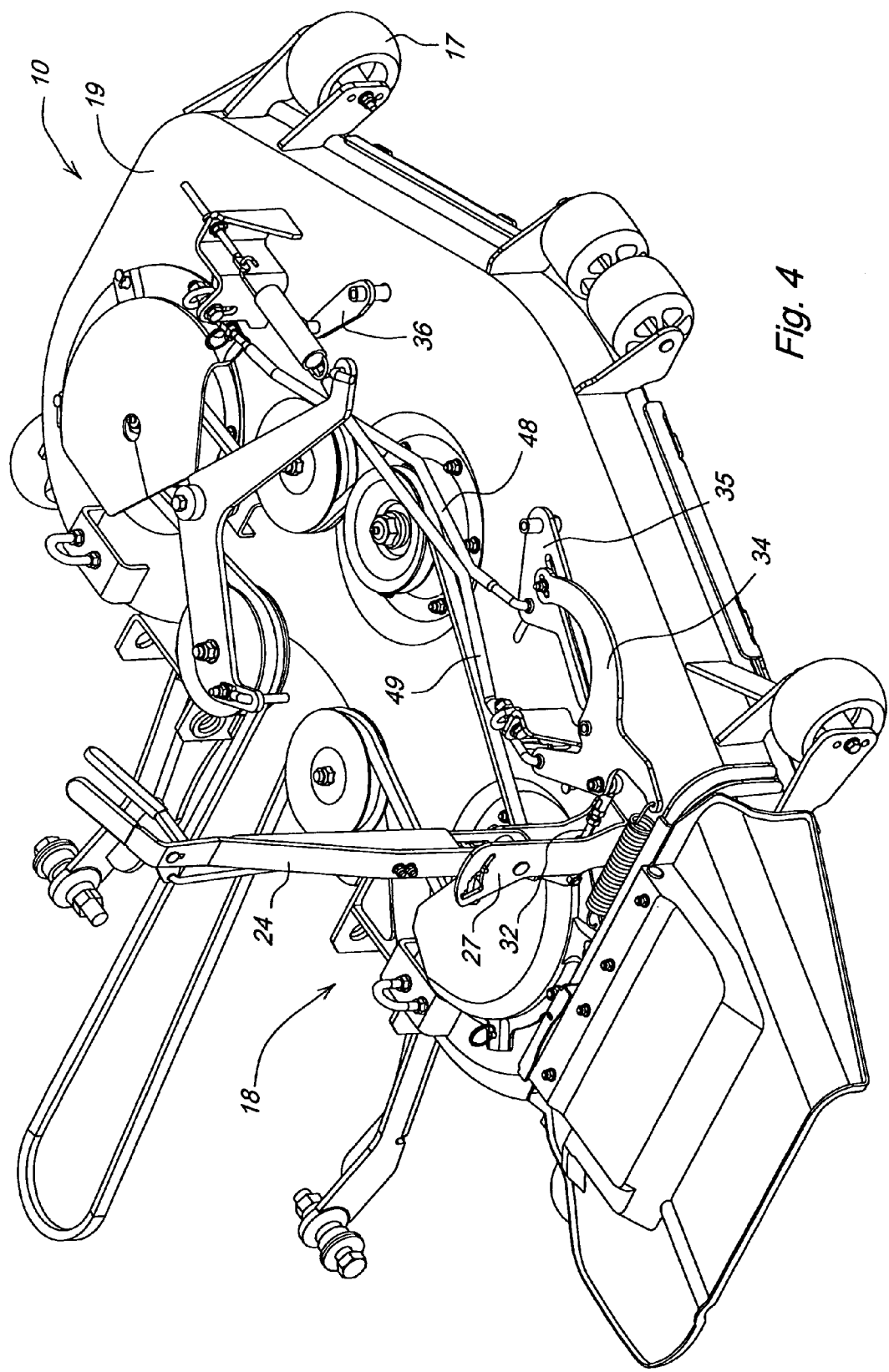
FIG. 4 is a top perspective of a convertible mower deck according to one embodiment of the invention.

In one embodiment, as shown in FIG. 4, control structure 18 may be mounted on or over the top surface of mower deck 10. The control structure may be used to selectively operate or shift baffles 41, 42, 43 between the discharge or collection position, and the mulching position, by controlling the size of the openings between adjacent cutting chambers and the discharge opening. The baffles may pivot between a discharge or collection position, a mulching position, and to one or more intermediate positions in which some of the grass clippings may be discharged or collected, and some of the grass clippings may be mulched simultaneously. The control structure may be linked to and control all of the baffles under the mower deck, and may move the baffles between open and closed positions, and also may move the baffles to intermediate positions in which they are partially open. In each position, the handle may be releasably secured or locked in the desired position, as will be explained in detail below.

In one embodiment, control structure 18 may include a generally vertically oriented pivoting handle 24 having a lower end linked to cranks 34–36. Each of the cranks 34–36 may be pivotably mounted on or over the top surface or plate 19 of mower deck 10. Each of cranks 34–36 may be attached to generally vertically aligned pivot shafts, and may be interconnected by rods or linkages 48–49. Crank 34 also may be connected by rod 32 to handle 24 which is part of the control structure used to move cranks 34–36 and their associated baffles between a discharge/collection position, a mulching position, and one or more intermediate positions in which the baffles are partially open.

In one embodiment, handle 24 may be reached from the operator's seat of the vehicle, and may pivot on a generally horizontal pivoting axis. The ability of an operator to reach and move handle 24 from a seated position allows the operator to easily shift between the discharge/collection position, mulching position, and one or more intermediate positions, while mowing. Upright support 27 may include a slot having a plurality of steps or notches to releasably lock and secure the handle at each of at least three positions into which the handle may be moved.

The baffles between the cutting chambers may be held in one or more intermediate positions between the fully open and fully closed positions. The volume of grass clippings transferred from one cutting chamber to the next may be controlled by the baffles between each chamber. The amount of grass clippings discharged or bagged may be controlled by the baffle at the discharge opening of the deck.

The embodiment shown in FIG. 4 provides control of all baffles with a single control structure, but in an alternative embodiment, the baffles between the cutting chambers, and the baffle at the discharge opening, may be controlled independently.

Having described the preferred embodiment, it will become apparent that various modifications can be made without departing from the scope of the invention as defined in the accompanying claims.

The invention claimed is:

1. An apparatus comprising:
   a mower deck covering a plurality of cutting chambers with a rotary cutting blade in each chamber and a discharge opening from one of the cutting chambers;
   a plurality of pivoting baffles between the adjacent cutting chambers;
   each baffle being movable between an open position allowing flow of grass clippings between the cutting chambers and a closed position blocking flow of grass clippings between the cutting chambers; and
   each baffle having a first plate and a second plate, the first plate interlocking with the second plate when the baffle is in the closed position.

2. The apparatus of claim 1 wherein the first plate and the second plate each have ends that interlock together when the baffle is in the closed position.

3. The apparatus of claim 1 wherein the mower deck has three cutting chambers and three rotary cutting blades.

4. The apparatus of claim 2 wherein the first plate has an interlocking end with a "J"-shaped cross section.

5. The apparatus of claim 2 wherein the second plate has an interlocking end with an "L"-shaped cross section.

6. The apparatus of claim 1 further comprising at least one stationary baffle under the mower deck, and wherein the first and second plates interlock adjacent the stationary baffle.

7. An apparatus comprising:
   a plurality of adjoining cutting chambers under a mower deck, each cutting chamber having a cutting blade mounted to the lower end of a vertical spindle;
   openings between adjoining cutting chambers;
   a discharge opening from one of the cutting chambers; and
   a plurality of baffles mounted under the deck in the openings between adjoining cutting chambers, each baffle including a pair of plates, each plate pivoting on a vertical axis, each plate having an end that interlocks with another plate.

8. The apparatus of claim 7 wherein each pair of plates includes a first plate with an interlocking end having a "J"-shaped cross section and a second plate with an interlocking end having an "L"-shaped cross section.

9. The apparatus of claim 7 wherein the plates are pivotable toward a first position to close the openings between the cutting chambers, or toward a second position to open the openings between the cutting chambers.

10. The apparatus of claim 7 wherein the plurality of baffles are mechanically linked together and to a control structure extending above the mower deck.

11. The apparatus of claim 7 further comprising a baffle mounted in the discharge opening and pivotable on a horizontal axis to open or close the discharge opening.

12. The apparatus of claim 7 further comprising a plurality of stationary baffles extending at least partially into the openings between the cutting chambers.

13. The apparatus of claim 7 wherein the baffles are pivotable to an intermediate position between a mulching position and a discharge or collection position.

14. The apparatus of claim 7 wherein the plates interlock when the baffles are in the mulching position.

* * * * *